SYSTEM FOR MAINTAINING PRESSURE IN REFRIGERATION SYSTEMS

Original Filed Dec. 23, 1957

INVENTORS:
JOHN A. SCHENK,
RALPH B. TILNEY,
BY Kingsland, Rogers & Ezell
ATTORNEYS United States Patent Office Re. 27,522
Reissued Nov. 28, 1972

27,522
SYSTEM FOR MAINTAINING PRESSURE IN REFRIGERATION SYSTEMS

John A. Schenk and Ralph B. Tilney, St. Louis, Mo., assignors to Emerson Electric Co.

Original No. 2,986,899, dated June 6, 1961, Ser. No. 704,665, Dec. 23, 1957. Application for reissue Nov. 12, 1969, Ser. No. 871,499
Int. Cl. F25b *41/00*
U.S. Cl. 62—196 5 Claims

Matter enclosed in heavy brackets [ ] appears in the original patent but forms no part of this reissue specification; matter printed in italics indicates the additions made by reissue.

*ABSTRACT OF THE DISCLOSURE*

*A refrigeration system with a bypass around the condenser, and a three-way valve to control refrigerant flow to (or from) the condenser and through the bypass, comprising a unitary pressure regulated valve member operable between opposite valve ports, and moved in response to pressure upstream of the expansion device to throttle flow through the condenser when that pressure is too low and at the same time to enlarge flow through the bypass. When the pressure is higher, the valve modulates to reduce flow through the bypass and increase flow through the condenser.*

The present invention relates to a system for maintaining pressure in refrigeration systems, and in its over-all concept comprises a compressor-condenser-evaporator type of refrigeration system wherein a bypass around the condenser is provided and equipped with a pressure-responsive three-way valve that regulates the opening of the bypass in response to pressure conditions near the condenser, and on the upstream, high pressure side of the expansion device.

The invention is primarily directed to the problem of maintaining an adequate pressure differential across a liquid refrigerant expansion device in a refrigerating system operated under the conditions of excessive condenser capacity. Such a condition, well known in the refrigerating industry, ordinarily occurs in an air-cooled system during cold weather operation. The excessive condensing capacity of the condenser, during cold weather operation, effects such a reduction in pressure at the high pressure or inlet side of the expansion device that the desired rate of refrigerant cannot be maintained with a normally sized expansion device. Also, over-capacity of the condenser makes it impossible to have hot gas available for defrosting.

The present invention contemplates the addition of a bypass line and a control valve for conducting at least a part of the refrigerant flow around the condenser, or, as an alternative, it contemplates the use of a divided condenser arrangement by which part of the condenser can be closed out of use by the valve; or the bypass line may conduct through a condenser section of lower condenser capacity. The valve is a three-ported regulating valve which is placed at the outlet of the condenser and which is adapted to modulate the flow of refrigerant through and around the main condenser, in accordance with a predetermined control pressure. When the control pressure point is exceeded, the three-ported regulator valve positions itself to close the bypass port thus forcing all of the refrigerant circulating in the system to pass through the main condenser. When the control pressure tends to fall below the control point, the three-ported regulator valve positions itself to allow some or all of the refrigerant to bypass the main condenser, and at the same time reduces the amount of refrigerant flowing out of the main condenser; thus causing positive control over the accumulation in the main condenser of the liquid refrigerant which, when filling any portion of the main condenser, prevents the condensing action on the refrigerant gas in that section, thereby reducing the condensing capacity of the condenser which, in turn, raises the condensing pressure and maintains the control pressure. This control pressure is one that can represent the pressure on the upstream side of the expansion valve, and may be condenser-inlet or condenser-outlet pressure.

It is an object of the present invention, therefore, to provide a novel refrigerant flow system which incorporates a refrigerant bypass around a main condenser, along with a regulator valve for automatically controlling flow therethrough, in accordance with a predetermined pressure.

It is another object of the invention to provide a novel three-ported regulating valve for maintaining a minimum pressure at the high pressure side of a liquid refrigerant expansion device in a refrigerating system.

It is another object of the invention to provide a novel mixing valve for simultaneously modulating the refrigerant flow through both the main condenser and the bypass to provide refrigerant flow above a predetermined minimum pressure.

It is another object of the invention to provide a control that, in the event of a failure of the resilient diaphragm, will allow the system to continue its normal function.

Other objects of the invention are to provide a three-ported modulating valve which is simple in its construction, efficient and dependable in its operation, and otherwise well suited to its intended purposes.

The foregoing, along with other objects and advantages, will be apparent from the following description of a specific embodiment of the invention as depicted in the accompanying drawing, in which.

Figure 1:
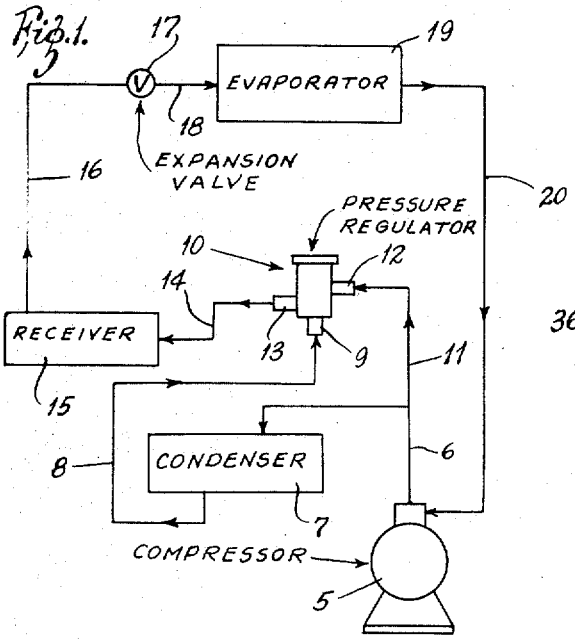
FIGURE 1 is a schematic diagram showing the flow pattern of a refrigerating system which incorporates the principles of the present invention.
Figure 2:
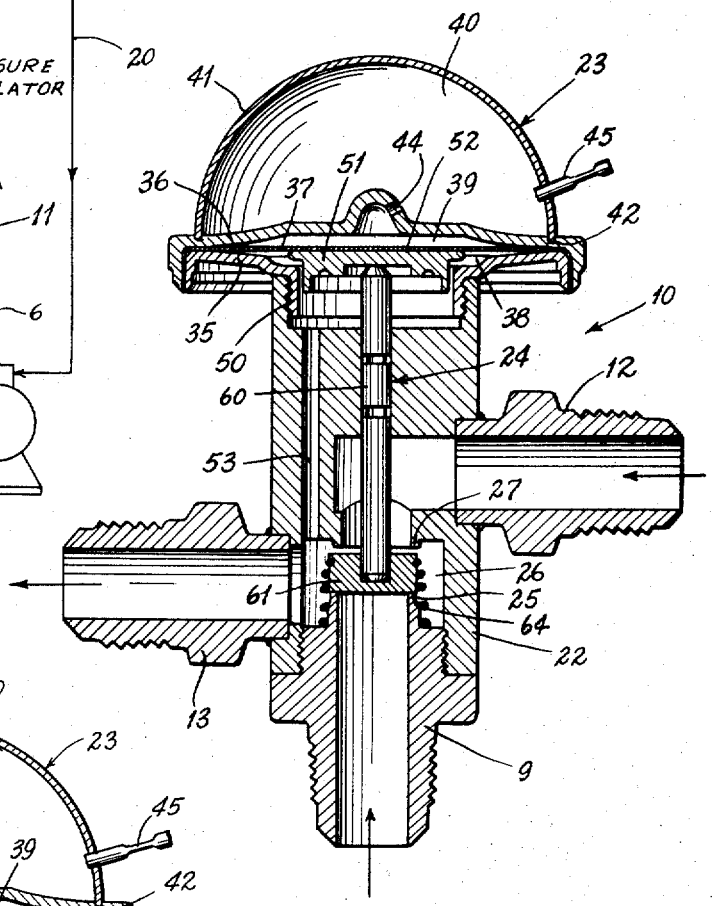
FIGURE 2 is a vertical sectional view of a pressure regulator constructed in conformance with the teachings of the invention.

Referring first to FIGURE 1, the refrigeration system has a compressor 5, discharging hot gas by an outlet 6 to a condenser 7. From the condenser 7, a pipe 8 leads to one inlet 9 of a three-way valve 10. There is also a bypass pipe 11 from the hot gas pipe 6, connected to a bypass inlet 12 of the valve 10. The outlet 13 of the valve 10 connects to a pipe 14 that leads into a receiver 15. The receiver outlet is connected by a pipe 16 to an expansion device 17, the downstream or low pressure side of which is connected by a pipe 18 to an evaporator 19. The evaporator outlet is connected by a pipe 20 back into the compressor 5.

Directing more particular attention to the details of the pressure regulator 10, it is noted that it is adapted to receive refrigerant flow at two connections or ports 9 and 12 and to proportion the flows so as to maintain an outlet or downstream pressure above a predetermined minimum. The regulator 10 comprises a main body 22 surmounted by a control head 23 and containing a movable valve assembly 24.

The main body 22 of the valve has a recess in its lower end into which the inlet fitting 9 is threaded. This fitting has a valve seat 25 at its upper end, that opens into a central mixing or valve chamber 26. The outlet fitting 13 is secured to the side of the body 22, so as to provide the outlet passage from the mixing chamber 26.

The body 22 has another valve seat, here connected to be the bypass valve seat 27, disposed opposite the valve seat 25. A flow passage from this valve seat 27 connects through the body to the bypass inlet fitting 12. Preferably the two lateral fittings 12 and 13 are permanently attached to the body 22, while the bottom or axial fitting 9 is removable for servicing of the valve seats, and assembly of the valve seats.

The control head 23 includes an inner diaphragm cover member 35 and an outer diaphragm member 36 of usual form as depicted in the drawing. These members have telescoping downturned peripheral flanges that enclose a resilient diaphragm 37 which serves to isolate a lower diaphragm chamber 38 from an upper diaphragm chamber 39. The size of the upper diaphragm chamber 39 is augmented, in effect by the dome chamber 40 which is formed by a dome 41 secured and sealed in a circular groove 42 in the top surface of the upper cover member 36. A passage 44 connects the dome chamber 40 with the upper diaphragm chamber 39, and it will be understood that the dome chamber 40 and upper diaphragm chamber 39 are filled through a filling nipple 45 with an appropriate gaseous fluid, such as nitrogen, to a predetermined pressure to be explained more fully hereinafter. Thus charged, the filling nipple 45 may be crimped and sealed so as to seal the charge within the dome chamber 40 and the upper diaphragm chamber 39.

As is clear from the drawing, the lower diaphragm cover member 35 includes an axial tubular portion 50 threaded into a recess in the upper end of the body 22. A thimble 51 within the lower diaphragm chamber 38 is centered within the tubular portion 50 of the lower diaphragm cover 35 so as to have guided axial movement therein. It does not close off or divide the diaphragm chamber. A flat upper surface 52 of the thimble 51 is provided for flush engagement with the diaphragm 37 which, under conditions later to be described, may be deflected upwardly from the position illustrated. A passage 53 formed in the body 22 connects the mixing chamber 26 on the outlet side of the valve seats with the upper end of the body 22, and hence with the lower diaphragm chamber 38 underneath the diaphragm 37.

The valve assembly 24 comprises a stem 60 and a valve member 61, interposed between the aforementioned valve seats 25 and 27 and is movable therebetween for selective seating engagement with either of the seats. The stem 60 has a lapped fit in an axial bore upwardly extending in the body 22, so that the stem 60 engages the underside of the thimble 51, as clearly shown in the drawing. The valve member 61 is also provided with a compression spring 64 having grooved engagement therewith and centered on the outside of the valve seat extension of the inlet fitting 9. This spring urges the valve 61 away from the seat 25, toward the seat 27.

Figure 3:
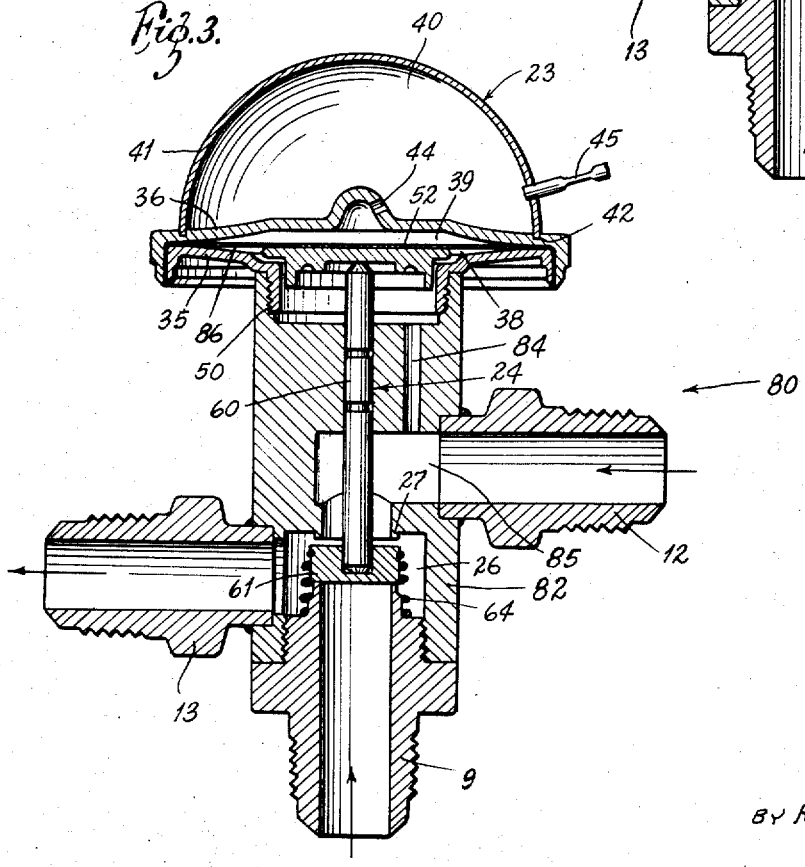
FIGURE 3 is a modified form of the pressure regulator depicted in FIGURE 2.

FIGURE 3 depicts a pressure regulator 80 which is identical with the above-described regulator 10 with the exception that a main valve body 82 corresponding to the body 22 has the connecting passage 53 eliminated therefrom and a passage 84 provided for connection of the bypass inlet port 85 with the underneath side of the diaphragm 86. This makes the valve operation sensitive to hot gas pressure rather than receiver pressure.

Operation

The pressure regulators 10 and 80 are adapted for use in a generally conventional refrigerating system as depicted in FIGURE 1. In the usual system, the compressor 5 delivers high pressure refrigerant through the condenser directly to the receiver from which the refrigerant is delivered through the expansion device, to the evaporator, eventually to return to the low pressure side of the compressor. It has been found, however, that under conditions of excessive condenser capacity, a sufficiently high pressure cannot be maintained in the receiver to enable the system to operate with desired efficiency. One difficulty arising is the inadequate driving force across the expansion device that results from insufficient pressure on its high side. It has been found further that this condition can be overcome through a process of bypassing at least a portion of the refrigerant delivered by the compressor around the condenser. Under exceptionally severe conditions, it may be necessary to bypass all of the refrigerant around the condenser, but more often only a portion will need to be bypassed in order to maintain a desired pressure in the receiver. Under normal conditions wherein the condenser capacity is not too great, as in the usual warm weather conditions in a stationary system, refrigerant will not be bypassed and all of it will flow through the condenser.

FIGURE 1 shows clearly the desired connection of either the regulator 10 or the regulator 80 in the system. The discharge pipe 6 from the compressor 5 is connected to condenser 7, the outlet 8 of which is connected into the inlet 9 of the valve 10. The bypass pipe 11 is connected to the inlet 12 of the valve 10. The outlet fitting 13 of the regulator 10 is then connected directly by the pipe 14 to the inlet of the receiver 15.

Considering first the operation of the regulator 10, the pressure within the receiver is communicated through the pipe 14, the outlet fitting 13, and the mixing chamber 26, thence through the passage 53 to the underneath side of the diaphragm 37. The diaphragm 37 will then be balanced between the force of this pressure, augmented by the force of the spring 64, and the force of the fluid within the upper diaphragm chamber 39 and dome chamber 40. Inasmuch as both the pressure derived from the spring 64 and that from the fluid within the chambers 39 and 40 will remain substantially constant, movement of the diaphragm will coincide substantially with variations in receiver pressure, and will reflect pressure conditions on the high side of the expansion valve. The initial charging of the dome chamber 39 and upper chamber 40 will be limited to that amount of fluid which will enable a desired minimum pressure within the receiver to move the diaphragm upwardly just sufficiently to enable the spring 64 to close the valve member 61 against the seat 27 with sufficient pressure to prevent fluid flow into the mixing chamber 26 from the bypass 12, and hence directly from the compressor by way of the bypass. It will be evident, then, that as long as the receiver pressure remains above this minimum, the bypass path through the valve seat 27 will be closed off and all of the refrigerant discharged by the compressor will pass through the condenser to enter the regulator through the main inlet passage 9. Within the regulator, it will pass through the valve seat 25, the chamber 26, and the outlet port 13.

In the event the receiver pressure falls below the desired minimum, the force beneath the diaphragm 37 becomes insufficient to maintain the valve member 61 seated against the seat 27, whereupon the pressure in the upper diaphragm chamber 39 will force the valve 61 away from its seat 27. Then some refrigerant will be bypassed to enter through the inlet 12, past the valve seat 27 and the valve 61 into the mixing chamber 26 for delivery through the outlet port 13 to the receiver.

When the valve member 61 moves away from the bypass seat 27, it moves toward the main seat 25, thereby restricting the flow of liquid refrigerant which is leaving the condenser and entering the control valve through the regulator passage 9 into the mixing chamber 26 for delivery through the outlet 13 to the receiver. When the flow of liquid refrigerant leaving the condenser is restricted as the valve 61 opens the bypass and throttles the inlet 9, an accumulation or build-up of liquid refrigerant takes place in the condenser, thereby reducing the available condensing surface for condensation of the refrigerant gas. Thus the condensing pressure in the condenser and the discharge pressure at the compressor are raised sufficiently to raise the receiver pressure back toward the predetermined minimum, which will then tend to close the valve onto the bypass seat 27 once more. If the condition of low receiver pressure persists, the valve member 61 will seek and find a position which will modulate the refrigerant flow through both the condenser and the bypass to create a condition which will maintain the receiver pressure at or above the desired minimum pressure within the limit of the gradient of the regulator.

Under an extreme condition, of course, the valve member 61 may become seated against the main valve seat 25 so that all of the refrigerant circulating in the system will be bypassed around the condenser to the receiver.

Attention is directed to the fact that the volume change of the inert gaseous fluid above the diaphragm 37 is relatively small due to the employment of the enlarged dome chamber 40 along with the upper diaphragm chamber 39.

Considering now the regulator 80, it is evident that the pressure sensed under the diaphragm will be, not that of the receiver, but that of the compressor discharge or the condenser inlet, inasmuch as the passage 84 communicates with the inlet port 85 in the valve 80. The use of the pressure taken from the compressor discharge or the condenser inlet in place of that taken from the receiver will provide less accurate control of the receiver pressure. However, where the necessity for bypassing refrigerant around the condenser will occur very infrequently, the construction of the valve 80 lends itself to a more economical production cost. For example, inasmuch as the inlet port is connected directly to the lower diaphragm chamber 38, there is no requirement for preventing refrigerant leakage along the valve stem 60. The construction of the valve 10, on the other hand, in view of the isolation between the inlet port 12 and the underside of the diaphragm 37 does necessitate the taking of special measures, such as a lapped fit of the stem 60 or the provision of suitable packing to prevent such leakage.

Certain variants that can accomplish the results, but with some disadvantages of cost, construction, or function, may be mentioned. For example, the upper diaphragm chamber and dome chamber comprise a substantially constant yieldable force means acting on the valve in opposition to high side pressure driving the refrigerant through the system. Spring means is a less desirable equivalent for this fluid pressure type of constant force means. Obviously, the pressure porting at 53 and 84 within the valve body are less expensive than external tubing to render the pressure in the lower diaphragm chamber subject to some specific spot in the high pressure side of the system. However, for ordinary installations of this kind, sensing any pressure around the condenser or the receiver sufficiently reflects pressure conditions at the high side of the expansion device to enable the valve to function in the desired manner.

It is to be understood that the foregoing description and the accompanying drawing have been given only by way of illustration and example. It is further to be understood that changes in the form of the elements, rearrangement of parts, and the substitution of equivalent elements, all of which will be apparent to those skilled in the art, are contemplated as being within the scope of the invention, which is limited only by the claims which follow.

What is claimed is:

1. In a refrigeration system of the compressor-condenser-expansion device-evaporator circuit type; a condenser having an inlet pipe and an outlet pipe; a bypass conduit connecting the inlet and the outlet pipes; an expansion device connected to the outlet pipe; and a valve in both the bypass conduit and one of said pipes, movable in opposite directions to obstruct the conduit and open the pipe, and vice versa, and pressure-responsive means responsive to a pressure upstream of the expansion device to urge the valve to throttle the bypass in response to rise of such pressure; and means applying a force yieldably urging the valve in the opposite direction to throttle the condenser pipe and open the bypass.

2. The invention of claim 1, wherein there is a means connecting the pressure-responsive device to receive pressure at a point upstream of the expansion device and downstream of the condenser.

3. The invention of claim 1, wherein the valve comprises a housing having two valve seats and a valve element movable back and forth between them, a port in the housing between the seats, a port in the housing on the opposite side of each seat; the pressure responsive means comprising a movable wall in the housing to move the valve element; the movable wall being subjected to a pressure corresponding to that in one of said ports, and the yieldable force means being disposed to act on the opposite side of the wall.

*4. The invention of claim 1, wherein the valve is connected into the system downstream of the condenser.*

*5. The invention of claim 4 wherein: the valve includes a valve body having a first valve inlet port for connection with the condenser outlet, a bypass inlet port for connection with the bypass conduit; and hence with the compresser outlet, and a valve outlet port for connection to effect flow downstream to the expansion device, the valve also having valving head means in the housing that moves in the manner stated, in one direction to obstruct the bypass inlet port and simultaneously to increase the opening of one of the other valve ports, and vice versa; the pressure-responsive means being connected to the valving head means and moving the same in a direction to throttle the bypass inlet port in response to rise of such pressure.*

References Cited

The following references, cited by the Examiner, are of record in the patented file of this patent or the original patent.

UNITED STATES PATENTS

| | | |
|---|---|---|
| 1,239,617 | 9/1917 | Newcombe. |
| 1,303,762 | 5/1919 | Bradford. |
| 2,252,300 | 8/1948 | McGrath. |
| 2,564,310 | 8/1951 | Nussbaum. |
| 2,761,287 | 9/1956 | Malkoff. |
| 2,869,330 | 1/1959 | Kramer. |
| 2,874,550 | 2/1959 | Musson. |

MEYER PERLIN, Primary Examiner